(12) United States Patent
Hollands et al.

(10) Patent No.: US 7,252,280 B2
(45) Date of Patent: Aug. 7, 2007

(54) METHOD AND DEVICE FOR MANUFACTURING PELLETS OF HOT-MELT INK

(75) Inventors: Peter Joseph Hollands, PT Baarlo (NL); Wilhelmus Antonius Maria Schreurs, BA Tegelen (NL); Guido Gerardus Willems, VS Venlo (NL); Antonius Johannes Jozef Van Gerven, AK Grubbenvorst (NL); Reinier Jan Ramekers, BM Oostrum (NL)

(73) Assignee: OCE-Technologies B.V., Venlo (NL)

( * ) Notice: Subject to any disclaimer, the term of this patent is extended or adjusted under 35 U.S.C. 154(b) by 43 days.

(21) Appl. No.: 10/644,024

(22) Filed: Aug. 20, 2003

(65) Prior Publication Data

US 2003/0234337 A1    Dec. 25, 2003

Related U.S. Application Data

(62) Division of application No. 10/079,556, filed on Feb. 22, 2002, now Pat. No. 6,673,299.

(30) Foreign Application Priority Data

Feb. 23, 2001  (EP) .................................. 01200691

(51) Int. Cl.
*B29C 39/26* (2006.01)
*B29C 39/38* (2006.01)

(52) U.S. Cl. ..................... 249/81; 249/105; 249/120; 249/121

(58) Field of Classification Search ................. 249/81, 249/105, 120, 121, 135
See application file for complete search history.

(56) References Cited

U.S. PATENT DOCUMENTS

| | | | | | |
|---|---|---|---|---|---|
| 2,031,786 | A | * | 2/1936 | Oldham | 425/573 |
| 3,640,081 | A | * | 2/1972 | Hadden | 62/1 |
| 4,035,462 | A | * | 7/1977 | Lane, Jr. | 264/503 |
| 4,455,320 | A | * | 6/1984 | Syrmis | 426/383 |
| 4,746,523 | A | * | 5/1988 | Binley | 426/249 |
| 4,812,323 | A | * | 3/1989 | Savage | 426/496 |
| 6,350,114 | B1 | * | 2/2002 | Simonds | 425/234 |
| 6,769,900 | B2 | * | 8/2004 | Murphy et al. | 425/468 |

FOREIGN PATENT DOCUMENTS

| | | | |
|---|---|---|---|
| CH | 679 263 A5 | * | 1/1992 |
| DE | 44 18 452 A | | 12/1994 |
| EP | 0 820 872 A | | 1/1998 |

OTHER PUBLICATIONS

English abstracts for CH 679 263.*
Patent Abstracts of Japan, vol. 014, No. 046 (M-0926), Jan. 26, 1990.

* cited by examiner

*Primary Examiner*—Robert B. Davis
(74) *Attorney, Agent, or Firm*—Birch, Stewart, Kolasch & Birch, LLP

(57) ABSTRACT

A method for manufacturing pellets of hot-melt ink which includes the steps of filling molten ink into a mold cavity defined by a first die and a second die of a mold, allowing the ink to cool down and solidify in the mold cavity, and heating at least one of the first and second dies for re-melting the surface of the ink pellet to facilitate its removal from the mold cavity.

20 Claims, 2 Drawing Sheets

METHOD AND DEVICE FOR MANUFACTURING PELLETS OF HOT-MELT INK

BACKGROUND OF THE INVENTION

This application is a Divisional of application Ser. No. 10/079,556, filed on Feb. 22, 2002 and now U.S. Pat. No. 6,673,299, the entire contents of which are hereby incorporated by reference and for which priority is claimed under 35U.S.C. § 120; and this application claims priority of Application No. 01200691 filed in Europe on Feb. 23, 2001 under 35 U.S.C. § 119.

FIELD OF THE INVENTION

The present invention relates to a method and a mold for manufacturing pellets of hot-melt ink.

BACKGROUND ART

Certain types of inkjet printers employ a so-called hot-melt ink i.e. a wax-like ink material that is solid at room temperature and has a melting point in the order of, for example, 80 to 150° C. In the printhead of the printer, the ink is heated above its melting point, so that droplets of liquid ink can be expelled through the nozzles of the printhead. In order to obtain a high quality of the printed image, the viscosity and hence the temperature of the molten ink in the printhead should be maintained essentially constant. However, since the ink is consumed in the course of the printing process, and the ink reservoir accommodating the liquid ink within the printhead is preferably of a limited size, it is necessary to supply and melt solid ink while the printer is operating. The latent heat required for melting the ink tends to decrease the temperature in the ink reservoir. For this reason, it is desirable that the amount of solid ink supplied to the ink reservoir is precisely controlled and metered, and, to this end, it is advantageous that the ink is supplied in the form of pellets having a predetermined size and shape, e.g. in the form of small spherical pills or pellets.

Since the hot-melt ink is a thermoplastic material, the pellets having the desired shape and size can be manufactured by means of a molding process similar to injection molding processes known for manufacturing articles from thermoplastic resins. The molding process however should be adapted to the specific properties of hot melt ink, which are, in certain respects, different from those of thermoplastic synthetic resins. Since the amount of shrinkage which the hot-melt ink experiences when it is solidified is comparatively low, and since a certain amount of shrinkage can be tolerated because the final appearance of the molded ink pellets is not critical, it is not necessary to apply high locking forces for keeping the mold closed during the molding process. On the other hand, since the hot-melt ink has a relatively high melting point, it tends to solidify immediately when it comes into contact with the walls of the mold cavity. This effect and the fact that the surface of the ink pellet is somewhat tacky, even when the temperature has dropped below the melting point, increases the tendency of the pellet to adhere to the walls of the mold cavity. This makes it more difficult to reliably and reproducingly remove the molded pellet from the mold die. Especially when the upper and lower dies of the mold are symmetrical, as must be the case for example when the pellet has a spherical shape, it is not predictable whether the pellet will adhere to the upper die or to the lower die when the dies of the molds are separated. This tends to reduce the productivity of the molding process and/or necessitates the use of complex mechanisms for ejecting the molded product from the die.

It is well known that the removal of a molded product from a die can be facilitated by employing a separating agent which reduces the adherence between the molded product and the walls of the mold cavity. In this case, however, a portion of the separating agent will inevitably be dispersed or diluted in the molten material, and this is not acceptable in the case of hot-melt ink because it deteriorates the quality of the ink. For example, even minute particles of the separating agent, when dispersed in the ink, tends to clog the extremely fine nozzles of the printhead or change the ink properties such as its surface tension or crystallization point.

SUMMARY OF THE INVENTION

It is an object of the present invention to provide a method for manufacturing pellets of hot-melt ink, in which the pellets can be reliably and reproducibly withdrawn from the mold cavity.

According to the present invention, this object is achieved by a method comprising the steps of:
  filling the molten ink into a mold cavity defined between a first die and a second die of a mold,
  allowing the ink to cool down and to solidify in the mold cavity, and
  heating at least one of the first and second dies for remelting only the surface of the ink pellet to be removed from the mold cavity.

According to the present invention, the molded pellet is separated from the wall of the mold cavity by heating at least a portion of the mold, so that a surface layer of the pellet is remelted. This can be achieved within a very short time. Thus, it is possible to remove the pellet from the mold cavity efficiently and in a well-defined manner. Since it is not necessary to employ a separating agent, the quality of the hot-melt ink will not be degraded.

When the lower die of the mold is heated before the upper and lower dies are separated, it is possible to positively release the pellet from the lower die and to withdraw it from the lower die, taking advantage of the fact that the pellet tends to adhere to the upper die which is not heated. Then, the pellet is released from the upper die by any suitable means, thereby allowing the pellet to simply drop out of the upper die. The pellets dropping out of the upper dies may be collected by any suitable collection means such as a chute which is brought in position underneath the pellets that have been withdrawn from the lower dies.

Further, it is possible to release the pellet from the upper die by heating the latter. In a preferred embodiment, the method comprises the steps of first heating the lower die, then separating the upper and lower dies with the pellets adhering to the upper die, and heating the upper die, thereby allowing the pellet to drop out. The release of the pellet from the upper die may be assisted and accelerated by blowing air into the runner hole of the upper die. As an alternative, an ejector pin may be inserted through the runner hole. In this case, the ejector pin may be arranged stationary, so it enters into the runner hole and engages the pellet adhered thereto when the upper die and the pellet are lifted from the lower die.

A mold for manufacturing pellets of hot-melt ink in accordance with the method described above comprises first and second dies defining a mold cavity, wherein at least one of the first and second dies has a wall thickness which is smaller than half the diameter of the mold cavity. If the mold cavity is not spherical, the wall thickness of the die is smaller than half the average diameter.

Due to the small wall thickness, the die has a very low heat capacity, such that the surface layer of the molded pellet can be remelted very quickly by heating the die. The small heat capacity of the die has the further advantage that the molten ink in the mold cavity can be cooled and solidified more rapidly, so that the productivity of the molding process is increased.

Preferably, both dies of the mold have a small wall thickness and hence a small heat capacity and are made of a material having a high heat conductivity, e.g. aluminium. Also stainless steel is useable if the wall thickness is small enough. In a preferred embodiment, the wall thickness of the dies is smaller than a quarter of the diameter of the mold cavity. For example, if the mold cavity is spherical and has a diameter in the order of 10 mm, the wall thickness of the dies may be 1.5 mm or less.

Rapid cooling and re-heating of the dies may be achieved in a very simple manner e.g. by blowing cold and hot air or even a liquid against the dies. A number of other heating or cooling devices can be used.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A preferred embodiment of the present invention will now be described in conjunction with accompanying drawings, in which.

DETAILED DESCRIPTION OF THE INVENTION

Figure 1:
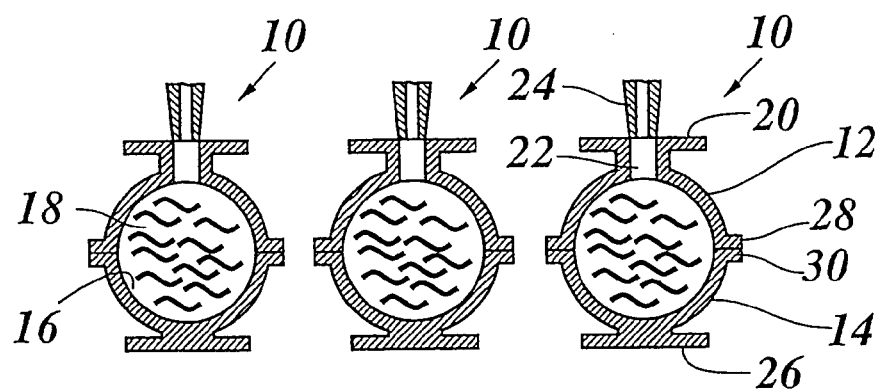
FIGS. 1 to 5 illustrate successive steps of a process for molding hot-melt ink pellets and removing them from the mold cavity.

FIG. 1 shows a group of three molds 10, each of which comprises an upper die 12 and a lower die 14 each of which have a semi-spherical cup shape and, together, define a mold cavity 16 which is filled with molten hot-melt ink 18. The upper die 12 is integrally formed with a top flange 20 and has a runner hole 22 formed in the center of the flange 20, so that molten ink can be poured into the mold cavity 18 through a nozzle 24.

The lower die 14 is essentially mirror-symmetric relative to the upper die 12 and is supported on a bottom 26 formed integrally therewith. The lower edge of the upper die 12 and the upper edge of the lower die 14 are surrounded by circumferential flanges 28, 30 which are held in firm engagement with one another in order to sealingly close the mold cavity 16.

When the ink 18 has been poured in, as is shown in FIG. 1, the molds are transferred to a cooling stage illustrated in FIG. 2, where cold air 32 is blown against the outer surfaces of the dies 12,14 from above and below, so that the ink in the mold cavities is cooled and solidified to form spherical pellets 34.

Figure 3:
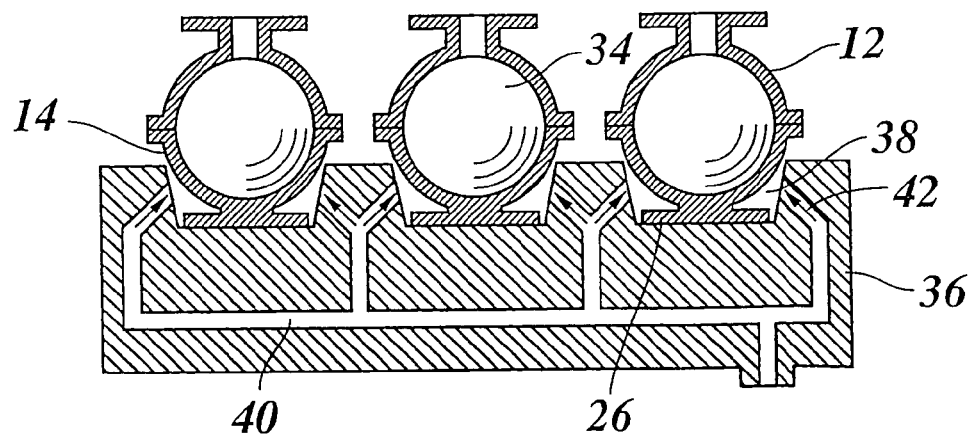

Then, the molds 10 are transferred to a first heating stage which is shown in FIG. 3. This heating stage comprises a heating block 36 having a number of recesses 38 for accommodating the lower dies 14 of the molds. The recesses 38 have a flat bottom, which defines a large contact area with the bottom flanges 26 of the lower dies 14. Hot air is supplied into a system of passages 40 formed in the heating block 36 and is evenly blown out against the circumferential walls of the lower dies 14 of each mold 10, as indicated by arrow 42. The dies 12,14 of the molds 10 are made of aluminium and have relatively thin walls (at least in the portion defining the mold cavity), so that their heat capacity is low, but their heat conductivity is high. As a result, the hot air blown against the walls of the dies 14 rapidly raise the temperature of these dies, and surface layers of the pellets 34 facing the lower dies 14 are re-melted, so that the pellets 34 can easily be released from the lower dies 14. However, since the upper dies 12 have not been heated, the solidified material of the pellets 34 still adheres to the upper die 12. Since the heating block 36 is constantly maintained at a high temperature (e.g. by the hot air passing therethrough), heating of the lower die 14 is accelerated by heat radiation and thermal contact between the block 36 and the bottom flange 26.

Figure 4:
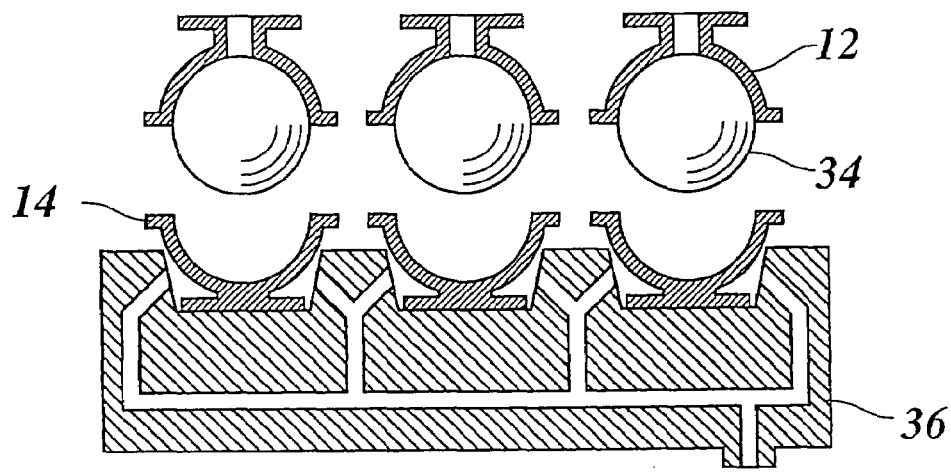

Then, as is shown in FIG. 4, the upper and lower dies of each mold 10 are separated from one another, either by lifting the upper dies 12 or by lowering the heating block 36 and the lower dies 14. Since the pellets 34 stick to the upper dies 12, they are withdrawn from the lower dies 14.

Figure 5:
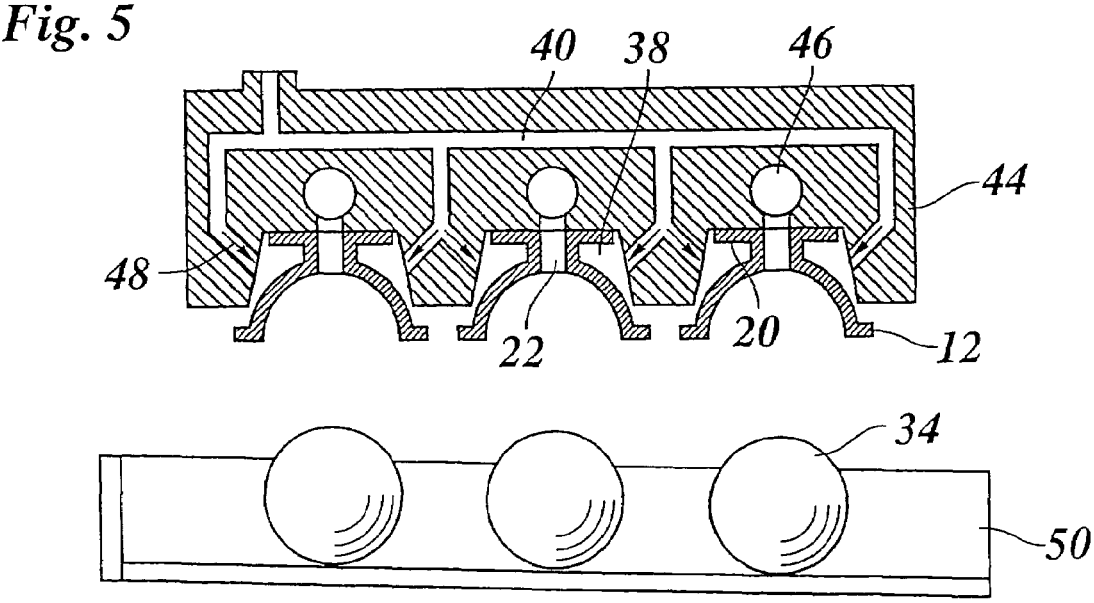

Finally, the upper dies 12 with the pellets 34 held therein are transferred to a second heating stage shown in FIG. 5. This heating stage comprises a heating block 44 which has essentially the same configuration as the heating block 36 described above, but is arranged in an inverted position so that the recesses 38 face downward for accommodating the top flanges 20 of the upper dies 12. In addition to the system of passages 40 for blowing hot air against the outer surfaces of the dies 12, the heating block 44 has another air supply system 46 through which air can be blown with a suitable pressure into the runner holes 22 of the dies 12. Again, by blowing hot air, indicated by arrows 48, against the dies 12, surface layers of the pellets 34 are re-melted, so that the pellets will no longer adhere to the dies 12 but will drop down into a chute 50. This process is assisted and accelerated by blowing pressurized air into the runner holes 22. Thus, the molding process for manufacturing the pellets 34 is completed, and the upper and lower dies 12, 14 may be re-circulated for use in another molding cycle.

Figure 2:
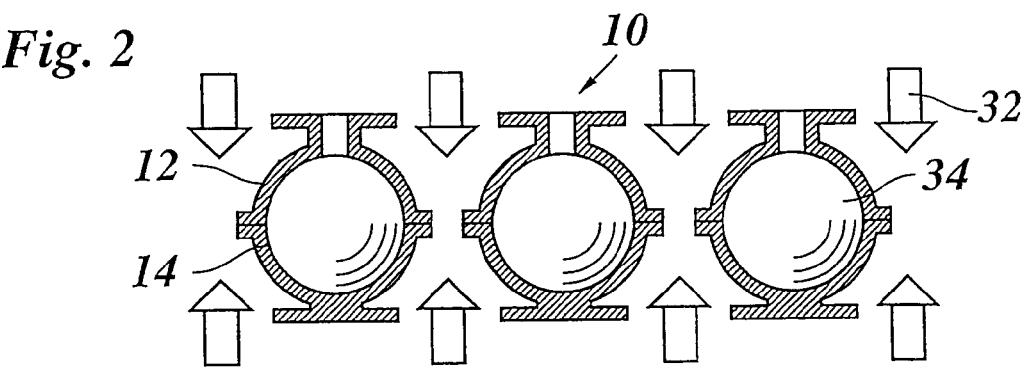

Although not shown in the drawings, the dies 12, 14 of the molds 10, the total number of which may be significantly larger than three, may be mounted to an endless conveyor in any known manner allowing to hold the molds 10 closed in the step illustrated in FIGS. 1 to 3 and to move the upper dies 12 and the lower dies 14 relative to one another in vertical direction in the step illustrated in FIG. 4. Thus, the process described above lends itself to an efficient mass production of hot-melt ink pellets 34.

What is claimed is:

1. A mold for manufacturing pellets of hot-melt ink which consists essentially of first and second dies which are essentially cup-shaped and have a wall thickness of smaller than 2.0 mm, said first and second dies defining a mold cavity, said dies being separable from one another, at least one of said dies having a wall thickness which is smaller than one-half the average diameter of the mold cavity, the upper one of said first and second dies containing a single runner hole disposed substantially in the center of said upper die and having a size sufficient for the introduction of ink for the manufacture of said pellets into the mold cavity.

2. The mold according to claim 1, wherein said dies are essentially cup-shaped and have a wall thickness smaller than 2.0 mm.

3. The mold according to claim 1, wherein the dies are made of a metal or a metal alloy.

4. The mold of claim 3, wherein the dies are made of aluminum or stainless steel.

5. The mold of claim 3, wherein a heating system is operatively associated with at least one of said dies.

6. The mold of claim 3, wherein the heating means includes means for blowing hot air against the outer surfaces of the dies.

7. The mold of claim 3, wherein said runner is adapted for introducing blown air into the mold cavity.

8. The mold of claim 5 wherein the heating means is a heating block containing a plurality of first and/or second dies of recesses for accommodating a plurality of molds.

9. The mold of claim 1, wherein the first and second dies define a substantially spherical mold cavity.

10. A mold for manufacturing pellets of hot-melt ink which comprises first and second dies defining a mold cavity, said dies being separable from one another, at least one of said dies having a wall thickness which is smaller than one-half the average diameter of the mold cavity, the upper one of said first and second dies containing a runner hole of a size sufficient for the introduction of ink for the manufacture of said pellets into the mold cavity;

and a heating system is operatively associated with at least one of said dies, said heating system being a heating block containing a plurality of first and/or second dies of recesses for accommodating a plurality of molds.

11. The mold of claim 10, wherein the recesses have a flat surface which defines a large contact area to accommodate corresponding flanges on the dies.

12. The mold of claim 1 wherein the mold cavity is completely sealed except for said runner hole.

13. A mold for manufacturing pellets of hot-melt ink which consists essentially of first and second dies made of a metal or a metal alloy and defining a mold cavity said dies being separable from one another, at least one of said dies having a wall thickness which is smaller than one-half the average diameter of the mold cavity, the upper one of said first and second dies containing a single runner hole disposed substantially in the center of said upper die and having a size sufficient for the introduction of ink for the manufacture of said pellets into the mold cavity, and a heating system operatively associated with at least one of said dies.

14. The mold according to claim 13, wherein said dies are essentially cup-shaped and have a wall thickness smaller than 2.0 mm.

15. The mold according to claim 13, wherein the dies are made of a metal or a metal alloy.

16. The mold of claim 13, wherein the heating means includes means for blowing hot air against the outer surfaces of the dies.

17. The mold of claim 13, wherein said runner is adapted for introducing blown air into the mold cavity.

18. The mold of claim 13 wherein the heating means is a heating block containing a plurality of first and/or second dies of recesses for accommodating a plurality of molds.

19. The mold of claim 8, wherein the recesses have a flat surface which defines a large contact area to accommodate corresponding flanges on the dies.

20. The mold of claim 13 wherein the mold cavity is completely sealed except for said runner hole.

* * * * *